United States Patent [19]

Faupell et al.

[11] Patent Number: 5,511,745
[45] Date of Patent: Apr. 30, 1996

[54] VECTORABLE NOZZLE HAVING JET VANES

[75] Inventors: Lawrence C. Faupell, North Logan; Steven R. Wassom, Smithfield; Joseph J. Kliger, North Ogden, all of Utah

[73] Assignee: Thiokol Corporation, Ogden, Utah

[21] Appl. No.: 366,848

[22] Filed: Dec. 30, 1994

[51] Int. Cl.[6] .............................. F02K 9/90; F02K 9/84; F42B 10/66
[52] U.S. Cl. ...................... 244/3.22; 60/230; 239/265.19
[58] Field of Search .................................. 160/230, 232; 239/265.35, 265.19; 244/3.22

[56] References Cited

U.S. PATENT DOCUMENTS

| | | | |
|---|---|---|---|
| H384 | 12/1987 | Dillinger et al. | 60/230 |
| 3,049,876 | 8/1962 | Connors | 60/35.6 |
| 3,096,049 | 7/1963 | Karasinski | 244/52 |
| 3,281,082 | 10/1966 | Kerry | 239/265.35 |
| 3,358,932 | 12/1967 | Wilhite | 239/265.43 |
| 3,371,491 | 3/1968 | Pinter | 60/230 |
| 3,401,887 | 9/1968 | Sheppard | 239/265.35 |
| 3,468,588 | 9/1969 | Bolner | 308/36.1 |
| 3,635,404 | 1/1972 | Hopkins et al. | 239/265.15 |
| 3,659,789 | 5/1972 | Schultz | 239/265.19 |
| 3,696,999 | 10/1972 | Desjardins et al. | 239/265.35 |
| 3,989,191 | 11/1976 | McCullough | 239/265.15 |
| 4,023,749 | 5/1977 | McCorkle, Jr. | 244/3.22 |
| 4,047,667 | 9/1977 | McCullough et al. | 239/265.35 |
| 4,108,381 | 8/1978 | Sottosanti et al. | 239/265.35 |

(List continued on next page.)

FOREIGN PATENT DOCUMENTS 277952  11/1990  Japan .................................. 60/230

OTHER PUBLICATIONS

R. P. Roger et al., "CFD Analysis for the Lift and Drag on a Fin/Mount Used as a Jet Vane TVC for Booster Control", *33rd Aerospace Sciences Meeting and Exhibit*, AIAA 95–0083, pp. 1–6, (Jan. 9–12, 1995).

I. Osofsky et al., "Solid Rocket Motor Thrust Vector Control by Insertable Vanes or Probes", *Sparta, Inc.*, pp. 539–547, (date unknown).

Y. Hsing et al., "Experimental Determination of the Ablation Rate of a Blunt–Wedge in Gas Particle Nozzle Flow", *AIAA/SAE/ASME/ASEE 27th Joint Propulsion Conference*, (Jun. 24–26, 1991).

A. Danielson, "Inverse Heat Transfer Studies and the Effects of Propellant Aluminum on TVC Jet Vane Heating and Erosion", *AIAA/SAE/ASME/ASEE 26th Joint Propulsion Conference*, (Jul. 16–18, 1990).

Gerhard et al., "Propulsion for Vertical Launched Aero–Reaction Control (Velarc) Prototype Program", *CIPA 260, 1974 JANNAF Propulsion Meeting*, vol. III, Part 2, pp. 549–560, (1975).

National Aeronautics and Space Administration, "Solid Rocket Thrust Vector Control", pp. 1–190, (Dec. 1974).

C. A. Yezzi et al., "Thrust Vector Control Technology Demostration", *Atlantic Research Corporation*, pp. 37–43, (date unknown).

*Primary Examiner*—Charles T. Jordan
*Assistant Examiner*—Christopher K. Montgomery
*Attorney, Agent, or Firm*—Ronald L. Lyons; Madson & Metcalf

[57] ABSTRACT

A system for providing pitch, yaw, and roll control during the flight of a rocket-propelled vehicle combines a vectorable nozzle with jet vanes. The vectorable nozzle provides yaw and pitch control, while the jet vanes provide roll control. Anti-rotation pins extend from the vehicle housing into longitudinal slots within the vectorable nozzle to allow vectoring movements and prevent rotation of the nozzle. The jet vanes are rotatably mounted on shafts within the nozzle exit cone to receive and guide combustion products passing through the nozzle. The jet vanes may be jettisoned after an initial high-angle-of-attack maneuver is completed and the vehicle gains speed, after which roll control is provided by aerodynamic fins. The jet vanes may also be formed of material which erodes after the initial maneuver, thereby reducing the loss of thrust caused by the jet vanes.

20 Claims, 2 Drawing Sheets

U.S. PATENT DOCUMENTS

| | | | |
|---|---|---|---|
| 4,143,837 | 3/1979 | Thunholm | 244/3.22 |
| 4,157,788 | 6/1979 | Canfield et al. | 239/265.35 |
| 4,168,031 | 9/1979 | McCullough et al. | 239/265.19 |
| 4,232,843 | 11/1980 | Clark et al. | 244/3.29 |
| 4,235,397 | 11/1980 | Compton | 244/12.5 |
| 4,272,040 | 6/1981 | Bastian et al. | 244/3.22 |
| 4,274,610 | 6/1981 | Bastin | 244/3.22 |
| 4,318,271 | 3/1982 | Doukakis et al. | 60/232 |
| 4,364,530 | 12/1982 | Ripley-Lotee et al. | 244/3.22 |
| 4,432,512 | 2/1984 | Young | 244/3.22 |
| 4,435,023 | 3/1984 | Bolner | 308/2 R |
| 4,478,040 | 10/1984 | Johnson | 60/225 |
| 4,497,460 | 2/1985 | Thorsted et al. | 244/3.3 |
| 4,506,832 | 3/1985 | Faupell | 239/265.35 |
| 4,562,980 | 1/1986 | Deans et al. | 244/3.22 |
| 4,579,299 | 4/1986 | Lavery et al. | 244/3.22 |
| 4,786,019 | 11/1988 | Uken | 244/169 |
| 4,867,393 | 9/1989 | Faupell et al. | 244/3.22 |
| 5,078,336 | 1/1992 | Carter | 244/3.22 |
| 5,082,202 | 1/1992 | Jacobson | 244/3.22 |

VECTORABLE NOZZLE HAVING JET VANES

BACKGROUND

1. The Field of the Invention

The present invention relates to a nozzle having vanes configured for controlling the amount and direction of roll of a rocket-propelled vehicle by guiding the flow of combustion products as they exit the vehicle. More particularly, the present invention relates to a vectorable nozzle having vanes mounted within an exit cone for guiding the flow of combustion products and thereby controlling roll at velocities which are too low and at angles of attack which are too high to permit effective roll control with aerodynamic fins.

2. Technical Background

Missiles and other vehicles that are propelled by rocket motors are normally equipped with a guidance mechanism to provide control over the yaw, pitch, and roll of the vehicle during flight. The ability to maintain control over the yaw, pitch, and roll of a vehicle is critical to ensuring that the vehicle will maintain a predetermined flight path. Even during high-angle-of-attack maneuvers, requiring substantial change in pitch, roll control must be maintained. For example, a high-angle-of-attack maneuver may be attempted to allow a vertically-launched surface missile to immediately pitch over to follow a generally horizontal flight path. A high-angle-of-attack maneuver is also desirable to permit an air-launched "dogfight" missile to execute a tight turn immediately after launch.

However, conventional guidance mechanisms generally do not provide satisfactory roll control during high-angle-of-attack maneuvers. For example, many conventional guidance mechanisms utilize a vectorable nozzle, generally referred to as a "thrust vector control" ("TVC") nozzle. TVC nozzles operate by positioning the nozzle at a desired angle with respect to the vehicle to alter the vector at which combustion products exit the vehicle. Changing the thrust vector by repositioning the nozzle alters the direction of the forces acting on the vehicle and thereby alters the vehicle's direction of flight. Although single, movable TVC nozzles provide adequate control over the vehicle's yaw and pitch, they do not provide any significant degree of roll control.

Accordingly, some vehicles are equipped with external aerodynamic fins for providing roll control. Such aerodynamic fins are rotatable about an axis perpendicular to the central longitudinal axis. These aerodynamic fins operate by transferring lateral aerodynamic drag forces acting on the fins to the vehicle. Because such forces are only present at sufficiently high velocities, aerodynamic fins are ineffective at low vehicle velocities and are totally ineffective in space. An additional disadvantage of such aerodynamic fins is that they are also ineffective at high angles of attack (i.e., angles of attack greater than about 30 degrees). Because many vehicles, particularly tactical missiles, are required to execute high-angle-of-attack maneuvers at low velocities, aerodynamic fins do not generally provide satisfactory roll control during such maneuvers.

Other conventional guidance mechanisms attempt to provide yaw, pitch, and roll control by placing movable blades within the flow of combustion products exiting the vehicle. One such mechanism includes three blades mounted within the vehicle. The blades include two smaller blades and one larger blade, with one of the smaller blades mounted on each side of the larger blade. The larger blade is partially rotatable about a first axis, and the two smaller blades are partially rotatable about a second axis perpendicular to the first axis. Each blade may be positioned independently of the other two blades. Thus, rotating the two smaller blades in the same direction alters the vehicle's pitch, while rotating the larger blade alters the vehicle's yaw. Tilting the two smaller blades in opposite directions alters the vehicle's roll.

However, in order to provide satisfactory yaw and pitch control, the blades in such a guidance mechanism must be relatively large. Large blades are undesirable because increasing the size of the blades in the exit path of the combustion products increases specific impulse losses, thereby decreasing the thrust generated by the rocket motor.

Thus, it would be an advancement in the art to provide a system for yaw, pitch, and roll control which provides satisfactory roll control at low vehicle velocities and during high-angle-of-attack maneuvers.

It would be a further advancement to provide such a system which does not decrease thrust by placing excessively large blades within the combustion product flow stream for yaw and pitch control.

Such a guidance system for yaw, pitch, and roll control is disclosed and claimed herein.

BRIEF SUMMARY OF THE INVENTION

The present invention is directed to a novel system for providing pitch, yaw, and roll control during the flight of a rocket-propelled vehicle such as a missile. Unlike conventional systems, the present invention does not rely solely on aerodynamic fins for roll control, nor does it require excessively large blades within the combustion product flow stream to control yaw and pitch. Rather, the present invention combines a vectorable nozzle with jet vanes. The vectorable nozzle provides yaw and pitch control while the jet vanes provide roll control.

More precisely, one embodiment of the invention includes a thrust vector control (TVC) nozzle which is capable of being flexibly mounted to the vehicle. The vehicle includes a rocket motor having a housing. The TVC nozzle includes a forward end, an aft end, and a central longitudinal axis. Suitable TVC nozzles include, without limitation, vectorable nozzles mounted by a flex bearing and vectorable nozzles mounted in a ball-and-socket joint. Conventional actuators link the TVC nozzle to the vehicle's rocket motor housing and allow movement of the TVC nozzle to control pitch and yaw by changing the thrust vector of the jet of combustion products exiting the vehicle.

A plurality of anti-rotation pins extend from the vehicle housing into longitudinal slots within the TVC nozzle. The pins and slots allow vectoring movements, which reposition the central axis of the TVC nozzle, but prevent substantial rotation of the TVC nozzle about its central axis relative to the vehicle's housing. Roll control forces are transferred from the TVC nozzle to the housing through the pins.

The system also includes at least two jet vanes mounted aft of the forward end of the TVC nozzle. The jet vanes are positioned generally about the central longitudinal axis of the TVC nozzle to receive and guide combustion products passing through the TVC nozzle. The jet vanes are rotatably mounted for rotation through a predetermined range of angles with respect to the longitudinal axis of the TVC nozzle. Rotating the jet vanes causes the exiting combustion products to exert roll control forces on the jet vanes. These roll control forces are transferred from the jet vanes to the TVC nozzle and thence to the vehicle housing, thereby providing roll control during flight of the vehicle.

It is presently preferred that the jet vanes be mounted on shafts within the exit cone of the vectorable TVC nozzle. However, those of skill in the art will appreciate that the jet vanes may also be effectively positioned aft of the exit cone, so long as they remain within the flow of exiting combustion products (the "jet") or can be moved into the jet. Unlike aerodynamic fins, which transfer forces imposed by the atmosphere, the jet vanes of the present invention operate by transferring forces from the jet of exiting combustion products to the vehicle.

In a presently preferred embodiment, three jet vanes are equally spaced apart about the central axis of the vectorable TVC nozzle. However, other embodiments include ten or more jet vanes. Using additional jet vanes allows each jet vane to be smaller, thereby reducing the drag and specific impulse losses caused by the jet vanes.

To further reduce the loss of thrust caused by the jet vanes, the jet vanes may be jettisoned once the flight conditions become such that the aerodynamic fins can provide roll control. This occurs as the vehicle gains speed and reduces its angle of attack. In another embodiment, the jet vanes are formed of material which erodes after the initial maneuver, thereby reducing the loss of thrust caused by the jet vanes. As vehicle velocity increases, the eroding jet vanes become less useful for roll control, but the aerodynamic fins also become more capable of controlling roll as the vehicle gains speed and reduces angle of attack.

Each jet vane is preferably substantially diamond-shaped in a cross-section parallel to the flow of exiting combustion products. Each jet vane is mounted to the exit cone by a rotatable shaft which meets the jet vane at the jet vane's center of pressure. The shaft and its corresponding jet vane may be formed as one unitary piece.

These and other features and advantages of the present invention will become more fully apparent by examination of the following description of the preferred embodiments and the accompanying drawings.

BRIEF DESCRIPTION OF THE DRAWINGS

In order that the manner in which the above-recited and other features and advantages of the invention are obtained may be understood, a more particular description of the invention briefly described above will be rendered by reference to the appended drawings. Understanding that these drawings only provide data concerning typical embodiments of the invention and are not therefore to be considered limiting of its scope, the invention will be described and explained with additional specificity and detail through the use of the accompanying drawings, in which.

DETAILED DESCRIPTION OF THE PREFERRED EMBODIMENTS

Figure 1:
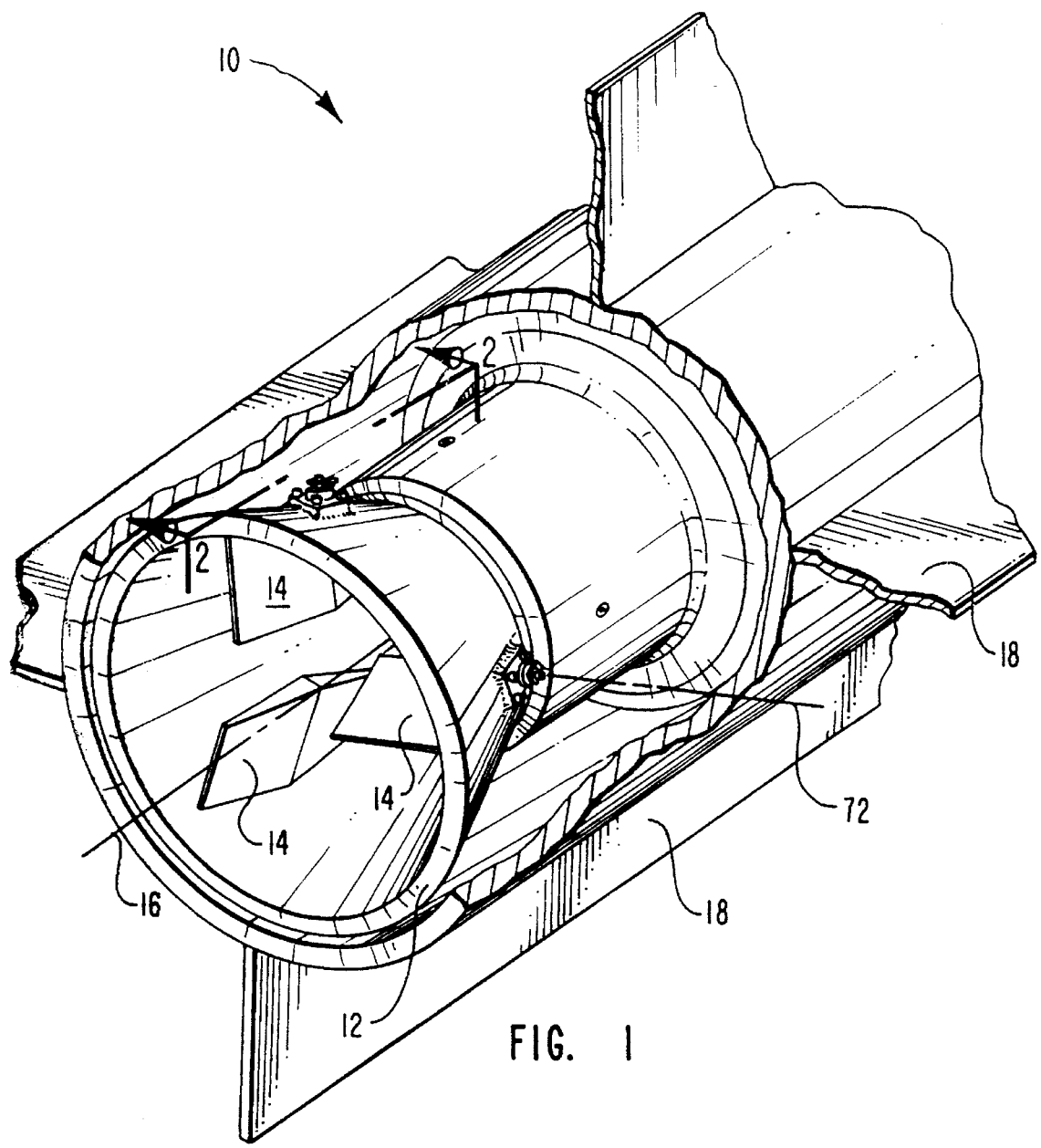
FIG. 1 is a perspective view of one embodiment of the present invention illustrating three jet vanes within an exit cone of a vectorable TVC nozzle.

Reference is now made to the figures wherein like parts are referred to by like numerals throughout. With particular reference to FIG. 1, a vehicle having a guidance system according to the teachings of the present invention is generally designated at 10. The vehicle 10 may include any of a variety of missiles in which the ability to execute low velocity or high-angle-of-attack maneuvers is desired.

The vehicle 10 includes a thrust vector control (TVC) nozzle 12 mounted in the aft end of the vehicle 10. One or more jet vanes 14 are mounted aft of the forward end of the TVC nozzle 12 and are positioned generally along the longitudinal axis 16 of the TVC nozzle 12 to receive combustion products (not shown) passing through the TVC nozzle 12.

Although this presently preferred embodiment employs three jet vanes 14, in alternative embodiments the number of jet vanes ranges from one upward. Although the force imposed on the vehicle by a single vane would include a component of pitch, such could be countered by the vectorable nozzle. One alternative embodiment includes ten jet vanes mounted near the aft end of the TVC nozzle 12. The size of an individual jet vane may decrease as the number of jet vanes increases, in a manner that is readily determined by those of skill in the art. Relatively small jet vanes may be used because the present invention does not require that the jet vanes be large enough to substantially control the yaw or pitch of the vehicle 10.

Because of limited clearance within the TVC nozzle 12, only three jet vanes 14 are utilized in this presently preferred embodiment. With the three jet vanes 14 positioned at 120 degree centers about the axis 16, there is sufficient room between adjacent jet vanes 14 to permit insertion of the third jet vane 14 during assembly of the system 10.

The vehicle 10 also includes aerodynamic fins 18 for providing roll control in addition to the control provided by the jet vanes 14. Once the vehicle 10 has obtained enough velocity at a sufficiently low angle of attack (less then about 30 degrees), the aerodynamic fins 18 will provide sufficient roll control without assistance from the jet vanes 14. However, the aerodynamic fins 18 are incapable of providing roll control at low velocities or during high-angle-of-attack maneuvers. When the velocity of the vehicle 10 is low, when the angle of attack exceeds about 30 degrees, or when some combination of these conditions occurs, roll control is therefore provided by the jet vanes 14 rather than the aerodynamic fins 18.

In embodiments of the vehicle 10 which include aerodynamic fins 18, the jet vanes 14 may be configured for removal following an initial period of burn. Examples of vehicles in which removable jet vanes may be desirable include vertically launched surface missiles which must immediately pitch over to a desired flight path and air-launched "dogfight" missiles which must execute a tight turn immediately after launch. For such applications, high angles of attack are only needed during the initial stages of burn (i.e., during about the first two seconds). Following the initial stages of burn, the angle of attack will generally be reduced and the vehicle velocity will have developed sufficiently that the requisite roll control may be provided by the aerodynamic fins 18. Removal of the jet vanes 14 may also be desirable in high-thrust, weight-restricted applications, because removing the jet vanes 14 tends to increase the thrust available to the vehicle 10 without requiring additional propellant.

The removal of the jet vanes 14 is preferably achieved in a manner that does not seriously degrade the quality of roll control of the vehicle 10. Roll control is preferably transferred to the aerodynamic fins 18 only after sufficient velocity has been developed and the angle of attack has been reduced to below about 30 degrees.

The jet vanes 14 may be removed by erosion or by explosive jettison. In the case of an explosive jettison, a conventional explosive charge is positioned adjacent the jet vane 14 in a manner readily determined by those of skill in the art. The explosive charge is configured to separate the jet vane 14 from the TVC nozzle 12 without damaging the TVC nozzle 12.

Erodible jet vanes 14 may be made of metal or composite materials which are erodible when subjected to combustion products passing through the TVC nozzle 12 during flight of the vehicle 10. Suitable erodible materials include conventionally known composite and ablative materials, including without limitation silica-phenolic and glass-phenolic. In alternative embodiments, the jet vanes 14 are made of refractory metal, carbon-carbon, carbon-phenolic, graphite-phenolic, ceramic, and other conventional TVC nozzle materials. The jet vanes 14 may be configured with erosion rates which match the decline in the effectiveness of the jet vanes 14 with the increase in effectiveness of the aerodynamic fins 18 such that roll control is transferred smoothly from the jet vanes 14 to the aerodynamic fins 18.

Figure 2:
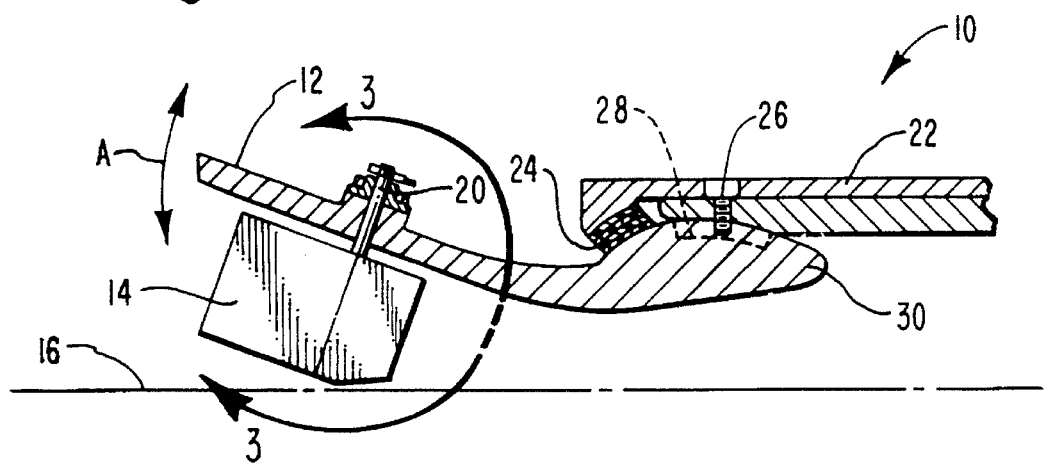
FIG. 2 is a cross-sectional view taken along line 2—2 in FIG. 1.

As illustrated in FIGS. 1 and 2, it is presently preferred that the jet vanes 14 be mounted on the TVC nozzle 12 with the jet vanes 14 positioned within the TVC nozzle 12. This configuration preserves the length of vehicle, thereby avoiding the removal of propellant to stay within length requirements. The jet vanes 14 are preferably positioned at the aft end of the TVC nozzle 12, thereby increasing the moment arm of the vane and enhancing the vane's ability to provide roll control.

As shown in FIG. 2, each jet vane 14 is rotatably mounted to the TVC nozzle 12 via a jet vane shaft 20. Rotation of the jet vane 14 about the jet vane shaft 20 allows positioning of the jet vane 14 at predetermined angles with respect to the longitudinal axis 16 of the TVC nozzle 12. Each jet vane shaft 20 is attached to its respective jet vane 14 at the center of pressure of the jet vane 14, namely, at the position where lift and drag act equally on the jet vane 14.

The TVC nozzle 12 is rotatably mounted to a housing 22 of the vehicle 10. In this presently preferred embodiment, the TVC nozzle 12 is flexibly mounted to the housing 22 with a flex bearing 24. As will be readily appreciated by one of skill in the art, a variety of other approaches may also be successfully employed to mount the TVC nozzle according to the teachings of the present invention. Indeed, virtually any conventionally known TVC nozzle and bearing combination may be utilized, including TVC nozzles of the trapped ball variety.

The aft end of the vehicle housing 22 is configured with anti-rotation pins 26. Each pin 26 is configured to ride in a corresponding longitudinal slot 28 positioned within the forward end 30 of the TVC nozzle 12. The longitudinal slot 28 has a length sufficient to allow full rotational displacement of the TVC nozzle 12 and a width substantially equivalent to the diameter of the pin 26. Additional slots 28 are provided at other positions within the forward end 30 of the TVC nozzle 12, the slots 28 preferably being spaced equally apart around the longitudinal axis 16. At least two anti-rotation pins 26 and corresponding slots 28 must be employed. The pins 26 and slots 28 allow vectoring movement of the TVC nozzle 12, as indicated generally by Arrow A in FIG. 2, and prevent rotation of the TVC nozzle 12 with respect to the vehicle 10 about the axis 16.

Figure 3:
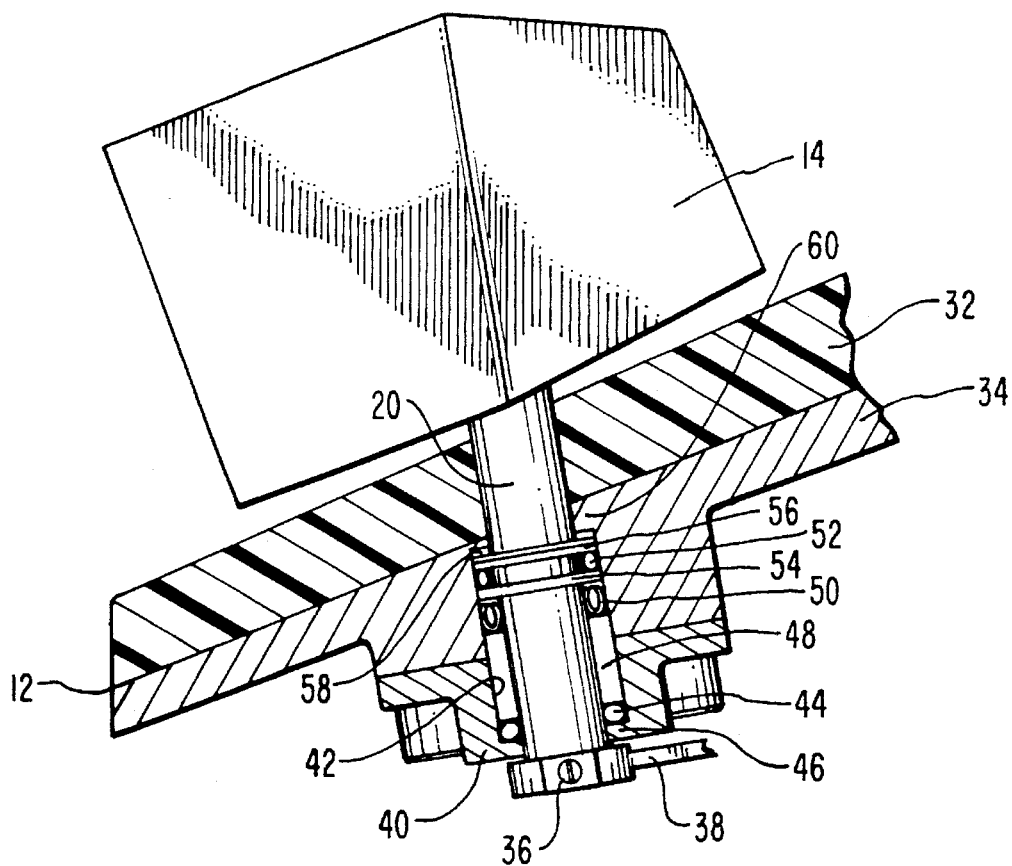
FIG. 3 is an enlarged view of a portion of the embodiment indicated by line 3—3 in FIG. 2.

One presently preferred method of mounting the jet vane 14 is illustrated in FIG. 3. In this embodiment, the jet vane 14 and the jet vane shaft 20 are separate pieces. Mounting the shafts 20 through the housing 22 allows the jet vanes 14 to reside inside the TVC nozzle 12, thereby keeping the overall length of the vehicle 10 substantially the same as in a vehicle that is not equipped with jet vanes.

The housing 22 includes an exit cone liner 32 which is secured within an exit cone body 34. The exit cone liner 32 is formed of conventional composite material such as silica-phenolic, while the exit cone body 34 is formed of a metal such as steel.

A retaining pin 36 connects the end of the shaft 20 to an actuator control arm 38 outside a retaining cap 40. The retaining pin 36 and the retaining cap 40 are formed of metal in a manner readily determined by those of skill in the art. The retaining cap 40 is secured to the exit cone body 34 by bolts or other conventional means. The actuator control arm 38 is capable of being actuated by a jet vane actuation mechanism (not shown) to rotate the shaft 20 and thereby position the jet vane 14. Such an actuation mechanism may include any of those mechanical, hydraulic, or other conventionally known actuation mechanisms.

The jet vane actuation mechanism is in communication with each jet vane for controlling the angle at which the jet vane is positioned. The jet vane actuation mechanism is preferably configured to move the jet vanes in unison such that the jet vanes substantially provide only roll control during flight of the vehicle.

The shaft 20 is positioned within a passage 42 in the exit cone liner 32 and body 34. An O-ring 44 which acts as a compression spring presses against a shoulder 46 of the retaining cap 40. The O-ring 44 is formed of rubber or other materials familiar to those of skill in the art. A substantially annular bearing 48 is positioned about the shaft 20 adjacent the compression spring O-ring 44. The bearing 48 is preferably formed of a polymeric material similar to the material employed in gaskets, O-rings, and piston rings sold under the trade name RULON by Dixon Industries Corp. of Bristol, R.I.

A seal ring 50 is positioned about the shaft 20 adjacent the bearing 48. The seal ring 50 is preferably a spring-loaded seal ring comprising a known material such as tetrafluoroethylene. A second O-ring 52 is positioned between two flanges 54, 56 which extend outwardly from the shaft 20. The O-ring 52 is formed of silicone rubber or another material familiar to those of skill in the art. The flanges 54, 56 are preferably integral with the shaft 20 and formed in unitary fashion from the same material as the shaft 20. A thrust washer 58 is positioned between the inner flange 56 and a shoulder 60 of the exit cone body 34.

In combination, the shaft 20 and the structures 40 and 44 through 60 provide a positive seal to prevent passage of combustion products through the passage 42 while still permitting rotation of the shaft 20 to position the jet vane 14 for roll control.

Figure 4:
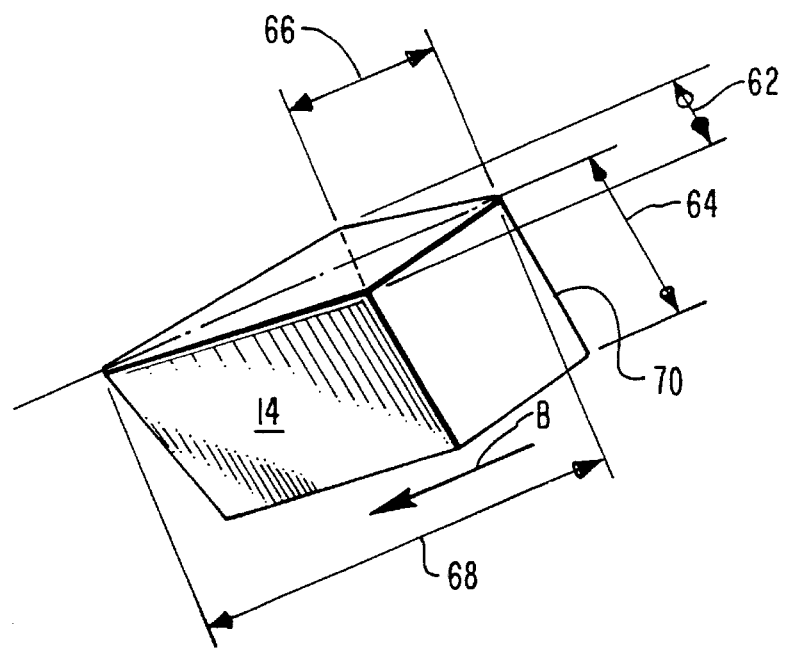
FIG. 4 is a perspective view further illustrating one of the jet vanes shown in FIG. 1.

With reference to FIG. 4, the presently preferred embodiment of the jet vane 14 has substantially diamond-shaped cross-sections through planes in the direction of the jet flow, which is indicated generally by Arrow B. Those of skill in the art will readily determine the appropriate physical dimensions of the jet vane 14, including the thickness 62, span 64, lead 66, and chord 68 dimensions. The appropriate physical dimensions depend in part of the number of jet vanes 14 used, on the spacing of the jet vanes 14 about the axis 16 (FIG. 1), on the position of the jet vanes 14 relative to the aft end of the TVC nozzle 12 (FIG. 1), and on the physical dimensions of the TVC nozzle 12.

It is presently preferred that certain ratios exist, regardless of the size of any particular dimension of the jet vane 14, in order to provide maximal roll control and minimal drag. In particular, the ratio of the length of the span 64 to the length of the chord 68 is preferably about 0.65. The ratio of the length of the thickness 62 to the length of the chord 68 is preferably about 0.15. The ratio of the length of the thickness 62 to the length of the lead 66 is preferably about 0.35.

It is also presently preferred that in embodiments not equipped with erodible jet vanes 14, the leading edge 70 of each jet vane 14 be relatively blunt to reduce erosion.

In operation, the TVC nozzle 12 and the jet vanes 14 illustrated in FIG. 1 are employed in combination to guide the vehicle 10. Pitch and yaw control are achieved in a manner familiar to those of skill in the art by positioning the TVC nozzle 12 relative to the remainder of the vehicle 10. Altering the position of the longitudinal TVC nozzle axis 16 with respect to the vehicle 10 alters the thrust vector associated with the jet of exiting combustion products (not shown), and thereby provides control over the pitch and yaw of the vehicle 10.

Roll control of the vehicle 10 is achieved by rotating the jet vanes 14 in unison about their respective longitudinal axes 72. In general, roll control is directed toward preventing the vehicle 10 from rolling too rapidly, as gyroscopic effects resulting from excessively rapid rolling can interfere with guidance of the vehicle 10. All jet vanes 14 are typically rotated in the same direction (clockwise or counterclockwise) about their respective shafts 20 (FIG. 2), and each is typically rotated the same amount. The direction and amount of jet vane rotation required to counteract a roll are readily determined by those of skill in the art.

With reference to FIGS. 1 through 3, the exiting jet (not shown) exerts roll-correction forces on the jet vanes 14 which correspond to the amount and direction of rotation of the jet vanes 14. The jet vanes 14 transfer these roll-correction forces to their respective shafts 20. The shafts 20 transfer the roll-correction forces to the exit cone body 34 of the TVC nozzle 12, which in turn transfers the forces to the housing 22 of the vehicle 10 through the anti-rotation pins 26.

The vehicle 10 may be a missile that is launched vertically from land or sea. Upon reaching the desired height, the missile is required to pitch over to a generally horizontal orientation and pursue a predetermined flight path. During this maneuver, the missile's velocity is too low and the angle of attack is too high for the aerodynamic fins 18 to provide adequate roll control. Accordingly, the jet vanes 14 are employed during this initial period to provide roll control.

As the missile gains speed and reduces its angle of attack, the jet vanes 14 may be removed. Removal may be accomplished by detonating a conventional explosive positioned near the shaft 20 (FIG. 2) of each jet vane 14. To facilitate a clean break, a portion of the shaft 20 may be deliberately made weaker than the remainder of the shaft 20, in a manner familiar to those of skill in the art. In an alternative embodiment, the vanes may be mounted on a mounting assembly which, in turn, is mounted to the TVC nozzle. In such an embodiment, the vanes may then be jettisoned merely by jettisoning the entire vane assembly.

Alternatively, the jet vanes 14 may be formed of an erodible material. The rate of erosion of the jet vane material may be selected such that the degree of roll control provided by the jet vanes 14 decreases gradually as the missile gains speed and the degree of roll control provided by the aerodynamic fins 18 accordingly increases.

In summary, the present invention provides a system for yaw, pitch, and roll control through a combination of the TVC nozzle and the jet vanes. Unlike aerodynamic fins, the jet vanes provide roll control at low velocities and during high-angle-of-attack maneuvers. The jet vanes are not required to provide yaw and pitch control, so it is not necessary to decrease thrust by placing excessively large blades within the combustion product jet. The thrust available to the vehicle may also be increased by jettisoning or eroding the jet vanes after sufficient velocity is achieved.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for providing pitch, yaw, and roll control during the flight of a vehicle, comprising:

a thrust vector control (TVC) nozzle for providing pitch and yaw control during flight of the vehicle, the TVC nozzle capable of being rotatably mounted to the vehicle and including a forward end, an aft end, and a longitudinal axis;

at least two jet vanes mounted aft of the forward end of the TVC nozzle and positioned generally about the longitudinal axis of the TVC nozzle to receive combustion products passing through the TVC nozzle, each of the jet vanes being rotatably mounted about a corresponding vane axis such that the jet vanes may be positioned at predetermined angles with respect to the longitudinal axis of the TVC nozzle, thereby providing roll control during flight of the vehicle; and a jet vane actuation mechanism, the jet vane actuation mechanism being in communication with each jet vane for controlling the angle at which the jet vane is positioned, the jet vane actuation mechanism configured to rotate the jet vanes about their respective axes at identical angles such that the jet vanes provide only roll control during flight of the vehicle.

2. The system of claim 1, wherein each jet vane is mounted on the TVC nozzle.

3. The system of claim 2, wherein each jet vane is positioned within the TVC nozzle.

4. The system of claim 3, wherein each jet vane is mounted at the aft end of the TVC nozzle.

5. The system of claim 1, wherein each jet vane is configured with a blunt leading edge.

6. The system of claim 1, further comprising a jet vane shaft attached to each jet vane, the jet vane shaft used in mounting the jet vane to the TVC nozzle, the jet vane shaft attached to each jet vane approximately at the center of pressure of the jet vane.

7. The system of claim 1, further comprising anti-rotation pins attached to the TVC nozzle to prevent roll forces induced by the jet vanes from causing rotation of the TVC nozzle during flight of the vehicle.

8. The system of claim 1, wherein the jet vanes are made of a material which is erodible when subjected to the combustion products passing through the TVC nozzle during flight of the vehicle.

9. The system of claim 8, wherein the jet vanes are made of a refractory metal.

10. The system of claim 8, wherein the jet vanes are made of a composite material.

11. A system for providing pitch, yaw, and roll control during the flight of a tactical missile, comprising:

a thrust vector control (TVC) nozzle for providing pitch and yaw control during flight of the missile, the TVC nozzle capable of being rotatably mounted and including a forward end, an aft end, and a longitudinal axis;

a plurality of jet vanes mounted on the TVC nozzle at a location aft of the forward end of the TVC nozzle and positioned generally about the longitudinal axis of the TVC nozzle to receive combustion products passing through the TVC nozzle, each jet vane being rotatably mounted about a jet vane shaft attached approximately at the center of pressure of each respective jet vane such that the jet vanes may be positioned at an angle with respect to the longitudinal axis of the TVC nozzle, thereby providing roll control during flight of the missile; and a jet vane actuation mechanism, the jet vane actuation mechanism being in communication with each jet vane for controlling the angle at which the jet vane is positioned, the jet vane actuation mechanism configured to rotate the jet vanes about their respective jet vane shafts at identical angles such that the jet vanes substantially provide only roll control during flight of the missile.

12. The system of claim 11, wherein the plurality of jet vanes comprises at least ten jet vanes.

13. The system of claim 11, wherein the number of jet vanes is an odd number greater than one.

14. The system of claim 13, wherein the number of jet vanes is three.

15. The system of claim 11, wherein each jet vane is mounted on the corresponding jet vane shaft at the aft end of the TVC nozzle.

16. The system of claim 11, wherein each jet vane is mounted on the corresponding jet vane shaft to a TVC nozzle wall and each shaft passes through the TVC nozzle wall.

17. The system of claim 11, wherein each jet vane is integral and unitary with the corresponding jet vane shaft.

18. The system of claim 11, wherein the jet vanes are configured with a blunt leading edge.

19. The system of claim 11, further comprising anti-rotation pins attached to the TVC nozzle to prevent roll forces induced by the jet vanes from causing rotation of the TVC nozzle during flight of the vehicle.

20. The system of claim 11, wherein the jet vanes are made of a material which is erodible when subjected to the combustion products passing through the TVC nozzle during flight of the vehicle.

* * * * *